United States Patent [19]
Kim

[11] Patent Number: 5,909,484
[45] Date of Patent: Jun. 1, 1999

[54] AUTOMATIC DIALING METHOD FOR INFORMATION SERVICE IN TELEPHONE SYSTEM

[75] Inventor: Sung-Hyun Kim, Gumi, Rep. of Korea

[73] Assignee: Samsung Electronics Co., Ltd., Kyungki-do, Rep. of Korea

[21] Appl. No.: 08/821,181

[22] Filed: Mar. 19, 1997

[30] Foreign Application Priority Data

Mar. 19, 1996 [KR] Rep. of Korea .......................... 96-7413

[51] Int. Cl.$^6$ ................................................. H04M 11/00
[52] U.S. Cl. ..................... 379/100.14; 379/355; 358/434
[58] Field of Search ......................... 379/110.14, 100.03, 379/100.17, 93.18, 354–357; 358/400, 468, 440, 442, 443, 434

[56] References Cited

U.S. PATENT DOCUMENTS

| | | |
|---|---|---|
| 4,920,560 | 4/1990 | Kageyama . |
| 5,134,653 | 7/1992 | Satomi et al. . |
| 5,216,705 | 6/1993 | Yoshida et al. . |
| 5,289,533 | 2/1994 | Wasio . |
| 5,473,674 | 12/1995 | Maeda . |
| 5,506,895 | 4/1996 | Hirai et al. . |
| 5,612,993 | 3/1997 | Hanoka et al. ..................... 379/100.03 |

Primary Examiner—Wing F. Chan
Attorney, Agent, or Firm—Robert E. Bushnell, Esq.

[57] ABSTRACT

A method of automatically dialing for information service in a telephone system having memory including the first buffer storing time data corresponding time interval between digits input, the second buffer storing the time interval corresponding to the time data, and the third buffer storing the digits and time data. The method includes the steps of: forming a communication loop with a public switched telephone network when the first digit is input in an information registration mode, reading the time data corresponding to the time interval between the digits input from the first buffer and storing it between digits registered in the third buffer, and disconnecting the communication loop after completing registration of digits to be automatically dialed; and dialing a digit registered in the third buffer, delaying for a time interval corresponding to time data registered in the next location of the third buffer from the second buffer, and then dialing the next digit.

9 Claims, 8 Drawing Sheets

| time | TIM_TBL.time |
|---|---|
| 1 | A |
| 2 | B |
| 3 | C |
| 4 | D |
| 5 | E |
| 6 | F |
| 7 | G |
| 8 | H |
| 9 | I |
| 10 | J |

FIG. 5E

| TMP | CHR_TBL[TMP] |
|---|---|
| A | 1 |
| B | 2 |
| C | 3 |
| D | 4 |
| E | 5 |
| F | 6 |
| G | 7 |
| H | 8 |
| I | 9 |
| J | 10 |

FIG. 5F

| | |
|---|---|
| 1 | 7 |
| 2 | B |
| 3 | O |
| 4 | A |
| 5 | O |
| 6 | C |
| 7 | 4 |
| ⋮ | ⋮ |
| 13 | O |
| 14 | J |
| 15 | J |
| 16 | C |
| 17 | 3 |
| ⋮ | ⋮ |
| 23 | D |
| 24 | |
| ⋮ | ⋮ |

FIG. 5G

AUTOMATIC DIALING METHOD FOR INFORMATION SERVICE IN TELEPHONE SYSTEM

CLAIM FOR PRIORITY

This application makes reference to, incorporates the same herein, and claims all benefits accruing under 35 U.S.C. §119 from an application for Automatic Dialing Method For Information Service In Telephone System earlier filed in the Korean Industrial Property Office on Mar. 19, 1996, and there duly assigned Ser. No. 7413/1996.

BACKGROUND OF THE INVENTION

1. Field of the Invention

This invention relates to a data communication system having an automatic dialing function, and more specifically, relates to a method of automatically dialing a telephone number in a facsimile system having a telephone handset incorporated therein, when using an information service.

2. Description of the Related Art

A typical automatic route selection (ARS) function in an information communication system such as a facsimile system having a telephone handset is to provide a variety of information services such as retrieving, inquiring, and reading out information from an automatic answer control system when a subscriber's communication terminal is connected to the automatic answer control system through a telephone line. The user can retrieve, inquire, or read out information by following a guidance message provided by the automatic answer control system when using the information service. Generally, there are two techniques of servicing information in the automatic answer control system. The first method relates to a way in which the next service information is progressed when any key is input in the middle of the reproduction of a guidance message. The second method relates to a way in which the next service information is progressed when any key is input after completion of the playback of guidance message.

When the subscriber wants the information service, and the service is one that progresses to the next procedure when any key is input in the middle of reproducing the guidance message, the subscriber can input numeral keys according to the guidance message, using an automatic dialing function of the telephone handset such as one-touch dialing, speed dialing, and redialing functions as disclosed, for example, in U.S. Pat. No. 5,506,895 for Telephone Apparatus With Automatic Dialing Function issued to Hirai et al., U.S. Pat. No. 5,473,674 for Data Communication Apparatus Having An Auto-Dialing Function issued to Maeda, U.S. Pat. No. 5,289,533 for Facsimile Transmitting and Receiving Apparatus issued to Wasio et al., U.S. Pat. No. 5,216,705 for Data Communication Apparatus With Abbreviated Dial Key Having A Plurality Of Dial Data And Capable Of Selecting One Of Two Communication Functions issued to Yoshida et al., U.S. Pat. No. 5,134,653 for Automatic Dialing Machine issued to Satomi et al., and U.S. Pat. No. 4,920,560 for Method Of Automatic Dialing And Automatic Dialing Device For Facsimile Apparatus issued to Kayeyama. However, the subscriber cannot use the automatic dialing function when the information service is designed such that it requires the guidance messages to be completed before the next procedure can be requested. This service requirement often causes the codes entered according to the guidance message, to be input irregularly.

In the conventional automatic dialing function of the facsimile system having a telephone handset incorporated therein, dial signals are sequentially transmitted, and transmission interval of each pulse is fixed to three seconds, so that the user must calculate the transmission interval of pulses when registering a telephone number for performing an automatic dialing function. This manual operation interferes with accurate registration of the telephone number. Thus, the user cannot utilize some information services with automatic dialing functions because the automatic answer control system requires too long an interval between pulses.

SUMMARY OF THE INVENTION

Accordingly, it is therefore an object of the present invention to provide a method of voluntarily adjusting time interval between digits of a telephone number that is registered in a facsimile system for automatic dialing, to utilize an information service.

It is also an object to provide a method of retrieving or reading service information from a facsimile system using an automatic dialing function for an information service.

These and other objects of the present invention can be achieved by a method of automatically dialing for information service with a telephone having memory including a first buffer for storing time data corresponding time interval between digits input, a second buffer for storing the time interval corresponding to the time data, and a third buffer storing the digits and time data. The method includes the steps of: (a) forming a communication loop in a public switched telephone network when a first digit is input in an information registration mode, reading time data corresponding to the time interval between the digits input from the first buffer, storing the time data between digits registered in the third buffer, and disconnecting the communication loop after completing registration of digits to be automatically dialed; and (b) dialing a digit registered in the third buffer, delaying for the time interval after reading the digit corresponding to time data registered in the third buffer from the second buffer, and dialing the next digit.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 5A–5G are abstract representation of memory maps of a facsimile system according to the principles of the present invention.

DETAILED DESCRIPTION OF THE PREFERRED EMBODIMENT

Figure 1:
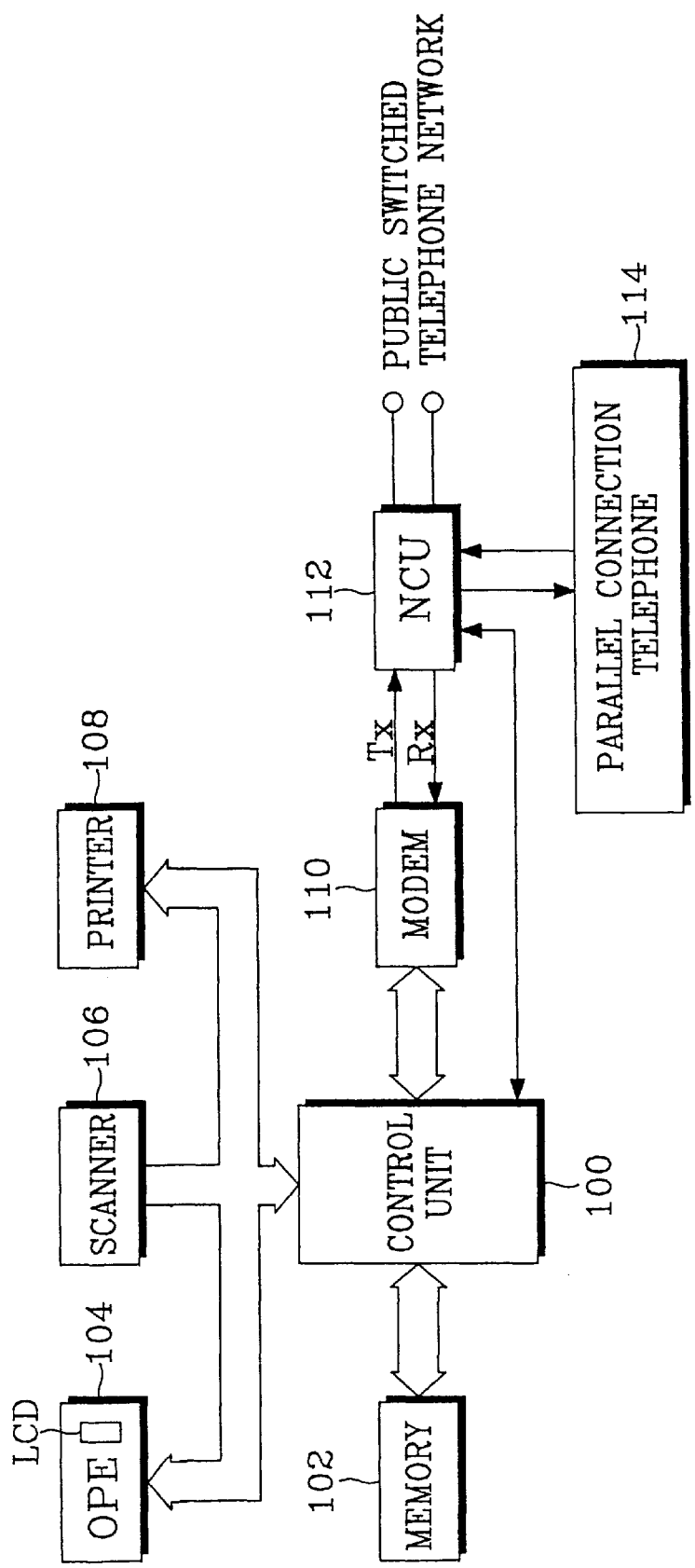
FIG. 1 is a block diagram of a facsimile system having a telephone handset constructed according to the principles of the present invention.

Referring now to the drawings and particularly to FIG. 1, which illustrates an exemplary facsimile system having a telephone handset constructed according to the principles of the present invention. The facsimile system includes a control unit 100 for controlling operations of the facsimile system, a network control unit (NCU) 112 connected to a tip and ring terminal of a telephone line of a public switched telephone network, a modem 110, a memory 102, an operational panel OPE having a liquid crystal display LCD 104, a scanner 106, a printer 118, and a telephone handset 114 connected in parallel to the NCU 112.

The memory 102 includes a program memory such as a ROM (not shown) which stores programs for the control unit 100 to control the general operation of the facsimile system for transmission or reception of image data from another communication system such as a telephone or a remote facsimile system including when there is no paper in a reception mode, or when particular functions such as a translation function or reception to memory function are selected, a data memory such as a RAM (not shown) which temporarily stores a variety of items of information, including service information. The operational panel (OPE) 104 includes a key input unit comprising a plurality of alpha-numeric keys and function keys that are independently operable by manual depression to provide key data to the control unit 100 to dial a telephone number of a counterpart communication system, and a liquid crystal display (LCD) for providing a visual display of data indicating various modes of operations of the facsimile system. The scanner 106 transports and scans an image of the input document and then generates image data corresponding to the scanned image. The image data output from the scanner 106 is then processed for either transmission via a telephone line or copy during the copy mode under control of the control unit 100. The printer 108 prints the processed image data received from the control unit 110 on a printable medium such as individual cut sheets of papers during the reception mode and the copy mode under the control of the control unit 100. The modem 110 modulates the processed image data output from the control unit 100 into a modulated image signal for transmission, and duplicates the image signal input to the control unit 100 during the reception mode under the control of the control unit 100. The NCU 112 is connected with a tip and ring terminals of a telephone line to form transmission and reception paths for the modem 110 under the control of the control unit 100. The telephone 114 is connected in parallel to the NCU 112 to allow voice communication under the control of the control unit 100.

Figure 2:
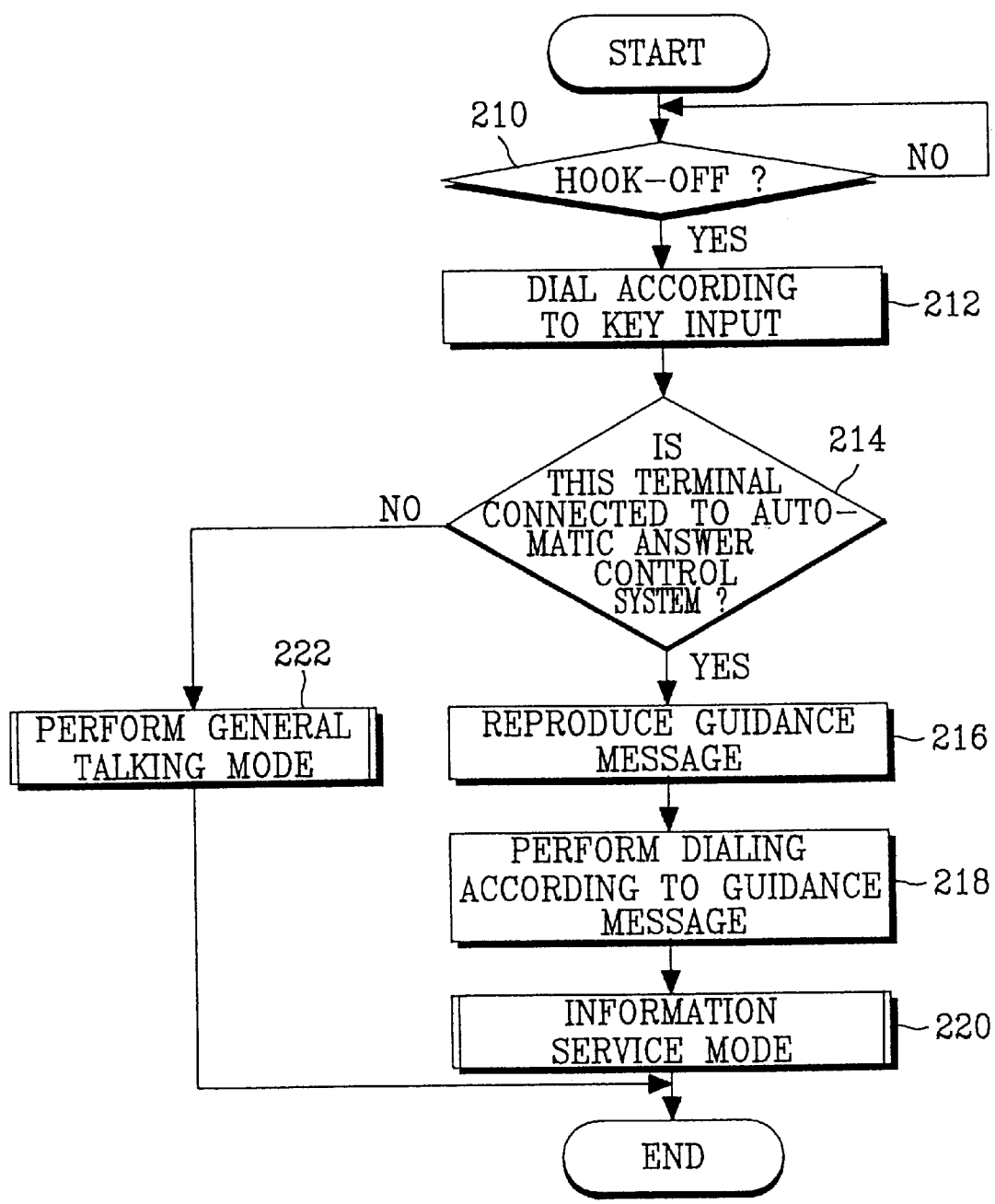
FIG. 2 is a flow chart of an exemplary telephone information service procedure of a facsimile system as shown in FIG. 1.

FIG. 2 is a flow chart illustrating an exemplary telephone information service procedure of a facsimile system having a telephone handset as shown in FIG. 1. Referring to FIGS. 1 and 2, the control unit 100 determines whether the telephone 114, which is connected parallel to the facsimile system, is off-hook, or whether a calling key in the on-hook state is entered from the OPE 104 at step 210. When the telephone 114 is off-hook or the calling key is detected, the control unit 100 connects NCU 112 to the PSTN so as to perform a dialing function according to key signals input from OPE 104 through modem 110 at step 212.

The control unit 100 then determines whether the user's communication terminal is connected to the automatic answer control system at step 214. If the user's communication terminal is deemed to be connected to the automatic answer control system, the control unit 100 will play the guidance message sent from the automatic answer control system at step 216. When the user inputs a key, using the OPE 104, according to the guidance message, the control unit 100 will perform dialing through the modem 110 at step 218. The control unit 100 then turns into an information service mode for retrieving information at step 220. When the user's communication terminal is not connected to the automatic answer control system at step 214, however, the control unit 100 performs general talk mode at step 222.

In such an exemplary facsimile system, however, when the user wants the information service, and the service is one which can progress to the next procedure when any key is input in the middle of reproducing the guidance message, the user can input numeral keys according to the guidance message, using an automatic dialing function. However, the user cannot use the automatic dialing function when the service is designed such that it requires the guidance messages to be completed before the next procedure can be requested. This service requirement unfortunately causes the codes entered according to the guidance message, to be input irregularly.

In the conventional automatic dialing function, dial signals are sequentially transmitted, and transmission interval of each pulse is fixed to three seconds, so that the user must calculate the transmission interval of pulses when registering a telephone number into the facsimile system for subsequently performing an automatic dialing function. This manual operation, however, interferes with accurate registration of the telephone number. As a result, the user cannot fully utilize some information services with the automatic dialing function because the automatic answer control system requires too long of an interval between pulses.

Figure 3A:
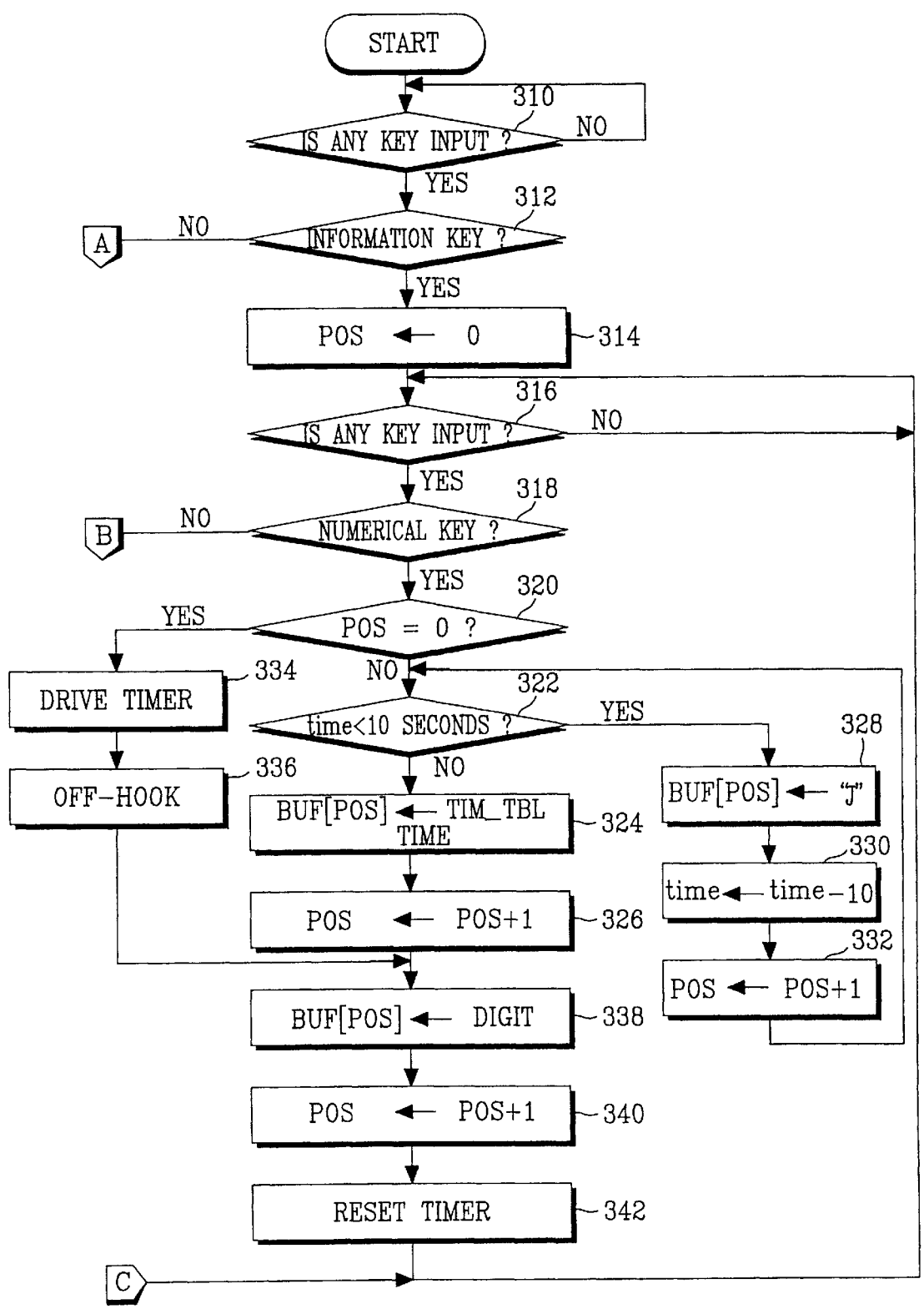
FIGS. 3A and 3B together form a flowchart of a registering mode of a facsimile system according the principles of the present invention.
Figure 3B:
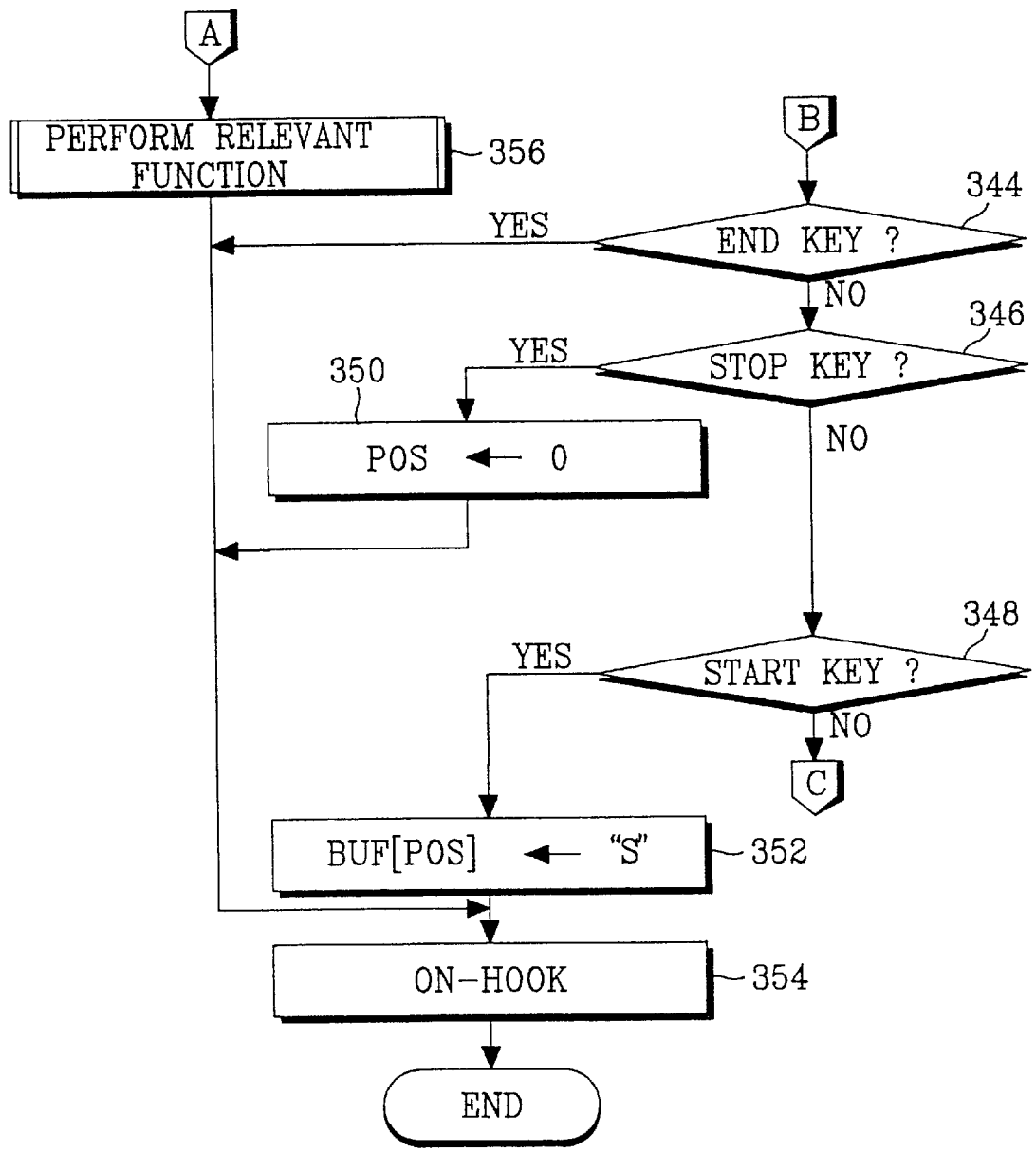

Turning now to FIGS. 3A and 3B which constitute a flow chart of registration of digits according to the principles of the present invention. The method of registering digits includes the steps of initializing a count value for designating an index of buffer where the time intervals between digits or pulses are registered, when the information registration key is input; starting a timer for measuring the time interval between pulses, and registering a digit input after forming a communication loop through off-hook, when the input of the first digit is sensed; setting the timer after increasing the counter by one and checking if the next digit is input; registering the value of the timer and the next digit when the next digit is input; finishing the procedure after initializing the counter, when a stop key is input in the middle of registering digits; and registering "S" indicating start in a predetermined buffer area if the start key is input after completing the digits register and disconnecting the communication loop through on-hook.

Figure 4:
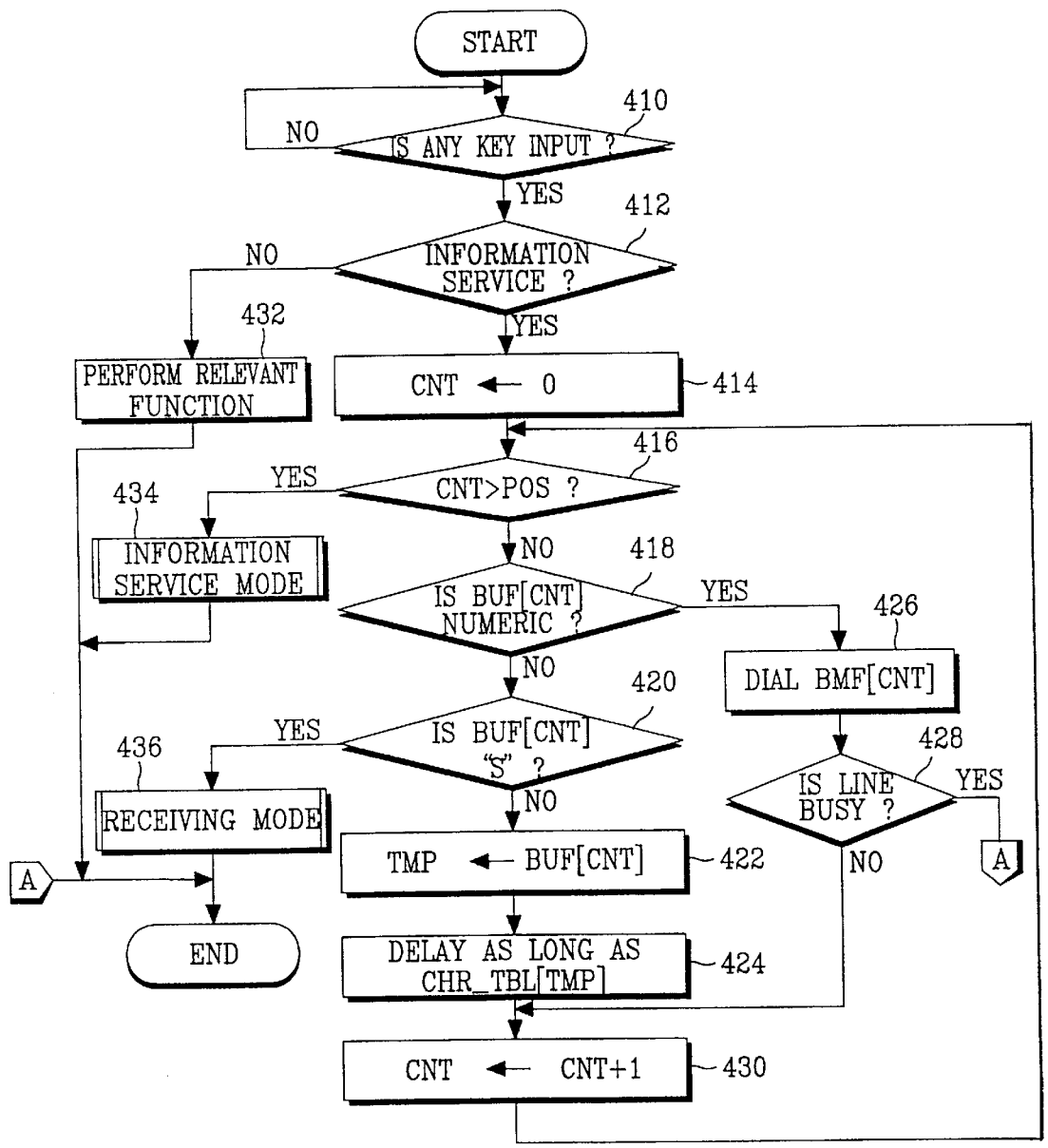
FIG. 4 is a flow chart of an executing mode of a facsimile system according to the principles of the present invention.

FIG. 4 is a flow chart illustrating a method of automatically dialing the digits registered in the facsimile system according to the present invention. The method includes the steps of: initializing a count for designating an index of the buffer area whose data will be reproduced when an information service key is input; dialing numbers where the data registered in the buffer area is numerical; delaying a time interval between the digits where the data registered in the buffer corresponds to a dialing interval, and increasing the count by one unit; performing an information receiving mode where the data registered in the buffer is "S" indicating a start key; dialing the number, and checking whether the data registered is reproduced after increasing the count by one unit, where a telephone line is not busy; and performing an information service mode when the data registered in the buffer is reproduced.

Figure 5A:
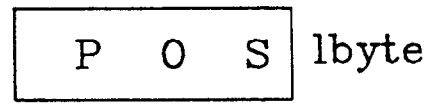
Figure 5B:

FIG. 5A is a map of temporary buffer where a count (POS) designating an index of buffer is registered. Data necessary for performing an automatic dialing function is registered in this buffer. FIG. 5B is a map of a temporary buffer where count (CNT) designating an index of buffer is registered.

Figure 5C:
Figure 5D:
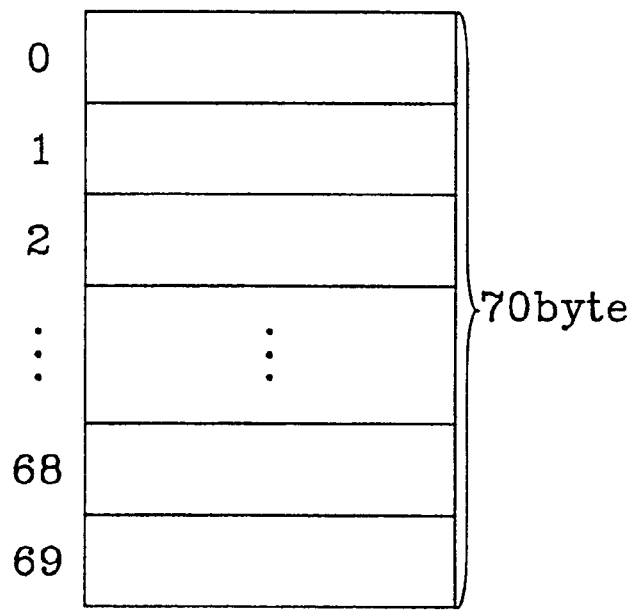
Figure 5G:
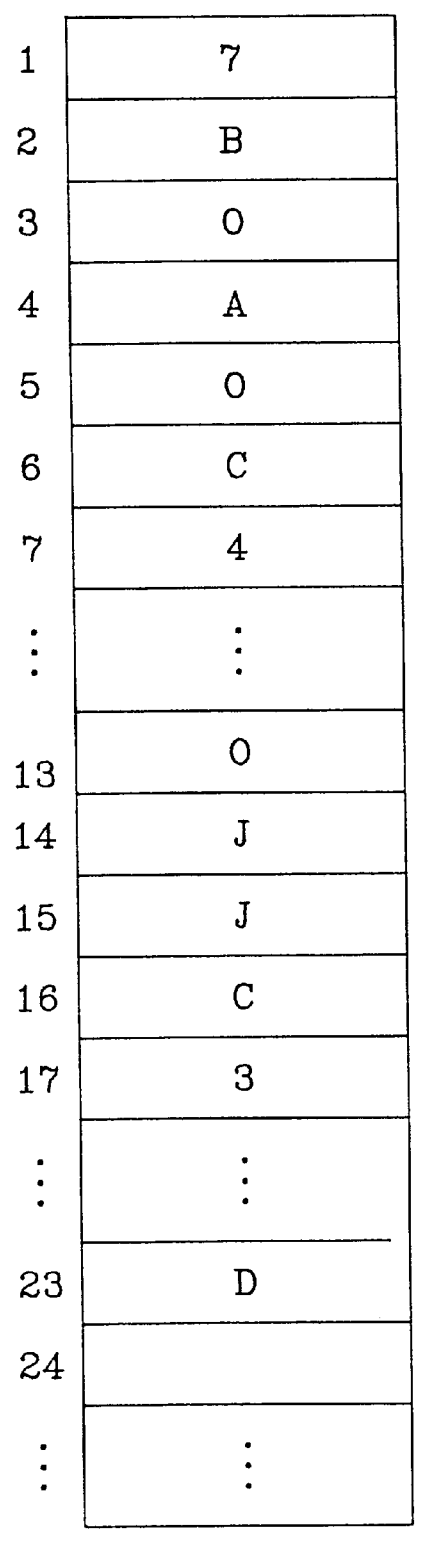

Data which will be reproduced during the execution of an automatic dialing function, is registered in this buffer. FIG. 5C is a map of a temporary buffer where data (TMP) of the time intervals between digits is registered after being read out from a buffer. FIG. 5D is a map of the buffer where digits which will be automatically dialed and data of delay time is stored, according to index (POS). FIG. 5B is a map of the buffer where time data (TIM_TBL. time) corresponding to the delay times is registered. FIG. 5F is a map of the buffer where time delays (TMP CHR_TBL[TMP]) corresponding to the time data (TMP) are registered. FIG. 5G is a map of the buffer after the registration is completed.

Referring to FIGS. 1, 3A–3B, 4 and 5A–5G, a preferred embodiment of the present invention is described in detail as follows.

As shown in FIGS. 3A and 3B, the control unit 100 determines whether a key is input from the OPE 104 at step 310. Where any key has been input from the OPE 104 at step 310, the control unit 100 determines whether an input key corresponds to an information registration key at step 312. When the input key does not correspond to the information registration key, the control unit 100 performs the relevant function of the key input at step 356, and then terminates the procedure after disconnecting the communication loop through an on-hook step 354. When the input key corresponds to the information registration key, however, the control unit 100 sets a count value, POS, to zero "0" at step 314. The count value indexes a buffer area (BUF[POS]) where data will be registered.

The control unit 100 then determines whether another key is input from OPE 104 at step 316. When another key is input at step 316, the control unit 100 proceeds to determine the type of key which was input, at steps 318, 344, 346, and 348. That is, when an input key input corresponds to a numeral key at step 318, the control unit 100 determines if it is a digit which is input for the first time at step 320. When the digit is determined to be the first one, the control unit 100 starts a timer installed therein at step 334, in order to measure time intervals between digits input. The control unit 100 controls the NCU 112 to form a communication loop at step 336, for the purpose of registering digits in response to the guidance message of an automatic answer control system. When the communication loop is formed, control unit 100 registers a digit in buffer (BUF[POS]) as shown in FIG. 5D at step 338. The buffer area has an index, which is designated by count POS registered in the temporary buffer as shown in FIG. 5A. After completing registration, the control unit 100 increases the count POS by one unit at step 340, and after initializing the timer at step 342, returns to step 316. When a key input is judged as a numeral key corresponding to the next digit at steps 318 and 320, the control unit 100 checks if a predetermined time such as ten seconds has elapsed since the previous digit was input through the timer at step 322. If ten seconds has passed, the control unit 100 registers time data "J" corresponding to ten seconds in buffer area (BUF[POS]) whose index is designated by count POS registered in the temporary buffer as shown in FIG. 5A at step 328. Control unit 100 reduces the time obtained from the timer, by ten seconds at step 330, and checks if the rest of the time is larger than ten at step 322 after increasing counter POS by one unit at step 332. If the remaining time delay is larger than ten, the procedure returns to step 328, otherwise, progresses to step 324. The control unit 100 reads the time data (TIM_TBL. time), which represents the time interval between digits, from the buffer as shown in FIG. 5E, and records the same in buffer area (BUF[POS]) having index designated by POS at step 324, and then increases POS by one unit at step 326. Control unit 100 returns to step 316 after performing steps 338, 340, and 342.

When the key which was sensed at step 316 is determined to be a stop key at step 346, the control unit 100 sets POS to zero at step 350, controls the NCU 112 so as to disconnect the communication loop at step 354, then finishes the registration procedure. Alternatively, when the key sensed at step 316 is determined to be a start key at step 348, the control unit 100 registers "S" corresponding to the start key in a buffer area (BUF[POS]) designated by POS at step 352, and disconnects the communication loop at step 354. When the key sensed at step 316 is determined as an end key, the control unit 100 terminates the procedure after disconnecting the communication loop through an on-hook at step 354.

For example, when a telephone number for information service is 700-40000-3-8, registration procedure is as follows. Registration mode is selected through an input of an information registration key. If the first digit "7" is input, the timer will be started. The digit "7" is registered in the first buffer area after the communication loop is formed. The next buffer location is designated, and the time interval between the previous and present digits is recorded. If the time interval between the next digit "0", is two seconds, time data "B" corresponding to two seconds is registered in a predetermined buffer location. The digit "0" is registered in the buffer location next to the area where the time data is registered. Then next buffer location is designated. The timer is initialized. Then the timer measures the time interval between the second and the next digit. If it takes twenty-three seconds until the digit "3" is input following the digit "0", "J" corresponding to ten seconds is registered after the twenty-three seconds is compared with ten seconds. Thirteen seconds which is a result of reducing twenty-three seconds by ten seconds, is compared with ten seconds once more. "J" corresponding to ten seconds is registered in the next buffer area, and the time data "C" corresponding to the remaining three seconds is registered in the following buffer area. After the telephone number is completely registered through the method described above, and the end key is input, the registration mode for registering digits is terminated. Alternatively, where the start key is input after completing a registration of a telephone number, "S" will be registered for receiving information through the facsimile system. FIG. 5G illustrates a map of the buffer after the registration is completed according to the preferred embodiment of the present invention.

Turning now to FIG. 4 which is a flow chart of an executing mode of a facsimile system according to the principles of the present invention. The control unit 100 determines whether any key is input from OPE 104 at step 410. When a key is input at step 410, control unit 100 will determine if an input key is an information service key requiring automatic dialing at step 412. When the input key is the information service key at step 412, the control unit 100 sets CNT as shown in FIG. 5D, which is a count value for selecting a buffer location (BUF[CNT]) which will be reproduced, to the initial value such as zero "0", and registers the same in the temporary buffer as shown in FIG. 5B at step 414. Control unit 100 checks if all data of the buffer is reproduced, and compares POS registered in the temporary buffer as shown in FIG. 5A with CNT at step 416. When CNT is larger than POS, the information service mode is performed at step 434. However, when CNT is not larger than POS, the control unit 100 checks if the data registered in the buffer area (BUF[CNT]) as shown in FIG. 5D, which corresponds to the index selected by the CNT, is numerical at step 418. When the data registered in the buffer area (BUF[CNT]) is judged as numerical at step 418, the control unit 100 controls the modem 110 so as to dial digits which were read from the selected buffer area (BUF[CNT]) at step 426. Then, control unit 100 determines if the telephone line is busy at step 428. If the telephone line is not busy, the control unit 100 increases CNT registered in the temporary buffer as shown in FIG. 5B by one unit at step 430, and returns to step 416.

When the data registered in the buffer area (BUF[CNT]) as shown in FIG. 5D, which corresponds to the index selected by the CNT, is determined as not numerical at step 418, however, the control unit 100 checks if the same data corresponds to "S" representing the start key for starting a reception of information through the facsimile system at step 420. When the data corresponds to "S", the receiving mode is initiated at step 436. When the data of selected buffer area is not numeral, and it is not "S" at steps 418 and 420, the control unit 100 determines that the data is time data and proceeds to step 422. Control unit 100 transfers data registered in the selected buffer area (BUF[CNT]) in the temporary buffer (TMP) as shown in FIG. 5C at step 422. Control unit 100 reads the time registered in the buffer as shown in FIG. 5F, using the data stored in the TMP buffer as an index, and delays for the time which was read at step 424. After the time has elapsed, the control unit 100 increases CNT by one at step 430, and returns to step 416. When CNT is larger than POS at step 416, or when "S" is sensed at step 420, dialing ends.

Refer now to FIG. 5G which illustrates buffers resulted from the registration procedure, an executing procedure is described below. The executing mode is selected through the input of information service key. The first digit "7" is read and dialed. "B" in the next location is read and transferred to a temporary buffer TMP, and a two second delay, corresponding to "B", as shown in FIG. 5F, is executed. After two seconds elapses, the next digit "0" is read from the buffer as shown in FIG. 5G, and dialed. As described above, an automatic dialing function is executed through the repeating procedure of dialing digit and delaying for the time which was read. The digit "0" in the buffer location corresponding to the thirteenth index, is dialed. After twenty-three seconds corresponding to the time data of the fourteenth, fifteenth, and sixteenth buffer locations, the digit "3" registered in sixteenth buffer location is dialed. Finally, the digit of twenty-third buffer location is dialed, and then the information service mode is executed. When "S" for executing the receiving mode through a facsimile system, is registered in the twenty-fourth buffer location, the information from an automatic answer control system is received by the facsimile system.

As described above, the present invention can voluntarily designate the interval time between digits registered to perform an automatic dialing, thereby being capable of utilizing automatic dialing for an information service. Digits for automatic dialing is first registered manually, thereby easily presupposing the progress of information service and accurately dialing in dialing automatically.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of registering digits of a telephone number and automatically dialing digits of said telephone number for information service with a facsimile system having a telephone handset and a memory, said method comprising the steps of:

when said information dialing is selected by an operator for said information service, forming a communication loop by occupying a telephone network when a first digit of said telephone number is input, determining time data corresponding to each time interval between consecutive digits input, and registering the digits and the time data between the digits in said memory, and disconnecting the communication loop after completing registration of digits of said telephone number for automatic dialing; and when said automatic dialing is selected by said operator for said information service, dialing each digit of said telephone number registered in said memory in sequence, delaying said dialing between consecutive digits of said telephone number for the time interval registered in said memory after reading the time data from said memory.

2. A method of registering digits of a telephone number and automatically dialing the digits of said telephone number for information service in a facsimile system having a memory including a first buffer storing time data corresponding to time interval between digits input, a second buffer storing the time interval, and a third buffer storing the digits and time data, said method comprising the steps of:

(a) starting a timer for determining a time interval between digits input when a first digit is input when information registration is selected, forming a communication loop by occupying a telephone network, and registering the first digit in the third buffer;

(b) initializing the timer after completing step (a), and sensing and analyzing a key input;

(c) checking the timer, reading the time data corresponding to the time checked from the first buffer, and registering the time data in the third buffer when the key corresponding to the first digit is input in step (b);

(d) registering the digit analyzed in step (b) in the third buffer and returning to step (b) after initializing the timer;

(e) registering data corresponding to a start key in the third buffer when the start key for receiving information through the information service is input in step (b) and disconnecting the communication loop formed in step (a);

(f) analyzing data registered in a selected area of the third buffer when an automatic dialing is selected;

(g) dialing a digit registered in the third buffer when the data analyzed in step (f) corresponds to a digit, and returning to step (f);

(h) delaying for a period corresponding to the time data when the data analyzed in step (f) corresponds to the time data, and returning to step (f); and (i) converting the facsimile system into a reception mode for receiving information corresponding to images borne by documents when the data analyzed in step (f) corresponds to the start key.

3. The method of claim 2, further comprised of disconnecting the communication loop formed in step (a) regardless of the data which has been registered in the third buffer, when a stop key for stopping registration is sensed as having been input in step (b).

4. The method of claim 2, wherein step (c) comprises the sub-steps of:

checking whether the time interval between digits input is greater than a predetermined time period;

registering the time data corresponding to said predetermined time period in the third buffer when the time interval is greater than said predetermined time period, and returning to said step of checking the timer after reducing the time interval by said predetermined time period; and reading the time data corresponding to the time interval from the first buffer and registering the time data in the third buffer when the time interval is not greater than said predetermined time period.

5. A method of registering telephone digits in a facsimile system having a telephone handset and a memory containing a first buffer storing time data corresponding time intervals between digits input, a second buffer storing the time intervals corresponding to the time data, and a third buffer storing the digits and time data, said method comprising the steps of:

starting a timer for determining a time interval between digits input when a first digit is input in an information registration mode, forming a communication loop in a public switched telephone network, and registering the first digit in the third buffer;

initializing the timer after registration of the first digit in the third buffer, and analyzing a next digit input;

checking the timer, reading the time data corresponding to a checked time from the first buffer, and registering the time data in the third buffer in response to the next digit input;

registering the next digit input in the third buffer, and re-initializing the timer;

registering data corresponding to a start key in the third buffer, when the start key for receiving information through the information service is input, and disconnecting the communication loop formed in the public switched telephone network;

analyzing data registered in a selected area of the third buffer when an automatic dialing function is selected;

dialing the digit registered in the third buffer when the data analyzed corresponds to said digit, and returning to analyzing the data registered in the selected area of the third buffer;

delaying for a period corresponding to the time data when the data analyzed corresponds to the time data, and returning to analyzing the data registered in the selected area of the third buffer; and switching the facsimile system into a reception mode for receiving information when the data analyzed corresponds the start key.

6. The method of claim 5, further comprised of disconnecting the communication loop formed in the public switched telephone network, when a stop key for stopping registration is input.

7. The method of claim 5, further comprised of said steps of checking the timer, reading the time data corresponding to a checked time from the first buffer, and registering the time data in the third buffer in response to the next digit input, comprising the sub-steps of:

checking whether the time interval between digits input is greater than a predetermined time period;

registering the time data corresponding to said predetermined time period in the third buffer when the time interval is greater than said predetermined time period, and returning to said checking step after reducing the time interval by said predetermined time period; and reading the time data corresponding to the time interval from the first buffer and registering the time data in the third buffer when the time interval is not greater than said predetermined time period.

8. A method of registering telephone digits of a telephone number for automatic dialing in a facsimile system having a telephone handset and a memory, said method comprising the steps of:

when information registration is selected by an operator, starting a timer for determining a time interval between digits input of said telephone number after a first digit of said telephone number is input, forming a communication loop by occupying a telephone network, and registering the first digit in said memory;

initializing the timer after the first digit of said telephone number is registered in said memory, and analyzing a next digit input;

checking the timer, determining time data corresponding to the time interval between the first digit and the next digit input of said telephone number, and registering the time data in said memory;

registering the next digit input in said memory, and re-initializing the timer for each subsequent digit input of said telephone number until all digits of said telephone number are registered in said memory along with time data corresponding to the time interval between consecutive digits input of said telephone number;

after all digits of said telephone number are registered in said memory along with the time data corresponding to the time interval between consecutive digits input of said telephone number, registering data corresponding to a start key in said memory input for receiving said service information, and disconnecting said communication loop;

when automatic dialing is selected by the operator, analyzing data registered in said memory, and dialing said consecutive digits of said telephone number registered in said memory when the data analyzed corresponds to said digits, and delaying said dialing between consecutive digits of said telephone number for the time interval corresponding to the time data registered in said memory between said consecutive digits of said telephone number; and switching the facsimile system into a reception mode for receiving service information when the data analyzed from said memory corresponds the start key.

9. The method of claim 8, further comprised of disconnecting the communication loop formed in the telephone network, when a stop key for stopping registration is input.

* * * * *